United States Patent
Chen et al.

(10) Patent No.: US 7,568,083 B1
(45) Date of Patent: **\*Jul. 28, 2009**

(54) MEMORY MAPPED REGISTER FILE AND METHOD FOR ACCESSING THE SAME

(75) Inventors: Hong-Yi Chen, Fremont, CA (US); Henry Hin Kwong Fan, San Mateo, CA (US)

(73) Assignee: Marvell International Ltd., Hamilton (BM)

( * ) Notice: Subject to any disclaimer, the term of this patent is extended or adjusted under 35 U.S.C. 154(b) by 284 days.

This patent is subject to a terminal disclaimer.

(21) Appl. No.: 10/666,892

(22) Filed: Sep. 17, 2003

Related U.S. Application Data

(63) Continuation of application No. 10/627,269, filed on Jul. 25, 2003, now Pat. No. 7,437,532.

(60) Provisional application No. 60/468,802, filed on May 7, 2003.

(51) Int. Cl.
*G06F 9/34* (2006.01)

(52) U.S. Cl. .................. 711/220; 711/202; 712/43; 712/208; 712/229

(58) Field of Classification Search ............ 711/202, 711/220; 712/218
See application file for complete search history.

(56) References Cited

U.S. PATENT DOCUMENTS

| | | | |
|---|---|---|---|
| 5,497,499 A | 3/1996 | Garg et al. | |
| 5,560,032 A | 9/1996 | Nguyen et al. | |
| 5,583,804 A | 12/1996 | Seal et al. | |
| 5,701,493 A * | 12/1997 | Jaggar | 710/261 |
| 5,737,624 A | 4/1998 | Garg et al. | |
| 5,740,461 A | 4/1998 | Jaggar | |
| 5,809,522 A | 9/1998 | Novak et al. | |
| 5,809,528 A * | 9/1998 | Miller et al. | 711/136 |
| 5,826,055 A | 10/1998 | Wang et al. | |
| 5,832,292 A | 11/1998 | Nguyen et al. | |
| 5,926,841 A | 7/1999 | Novak et al. | |
| 5,987,583 A * | 11/1999 | Triece et al. | 711/214 |
| 6,038,653 A | 3/2000 | Nguyen et al. | |
| 6,131,157 A | 10/2000 | Wang et al. | |
| 6,192,463 B1 * | 2/2001 | Mitra et al. | 712/43 |
| 6,282,630 B1 | 8/2001 | Nguyen et al. | |
| 6,363,471 B1 * | 3/2002 | Meier et al. | 711/220 |
| 6,412,064 B1 | 6/2002 | Wang et al. | |
| 6,766,505 B1 * | 7/2004 | Rangan et al. | 716/16 |
| 7,024,544 B2 * | 4/2006 | Shelor | 712/229 |
| 2003/0159021 A1 * | 8/2003 | Kerr et al. | 712/218 |
| 2003/0200421 A1 | 10/2003 | Crook et al. | |

\* cited by examiner

*Primary Examiner*—Hetul Patel

(57) ABSTRACT

A register file for a data processing system comprises a memory unit, input ports, and output ports. The memory unit includes a plurality of memory locations. Each memory location is addressable by an encoded address, wherein the encoded address corresponds to at least one register and processor mode. The input ports receive inputs for addressing at least one memory location using an encoded address. The output ports output data from at least memory location addressable by an encoded address.

53 Claims, 13 Drawing Sheets

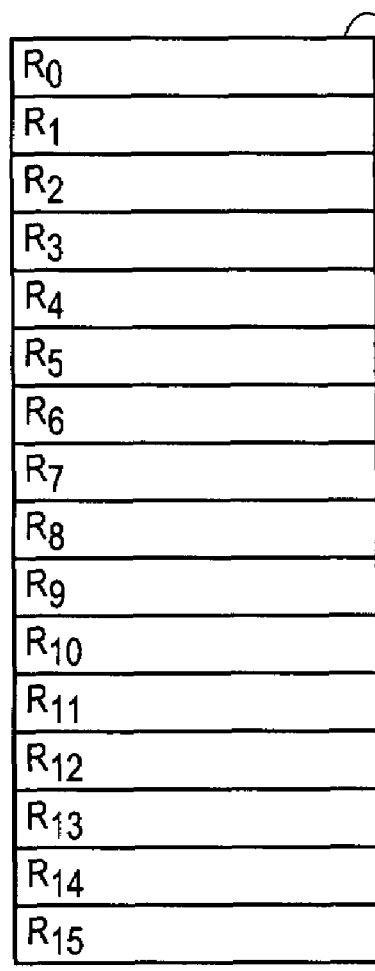
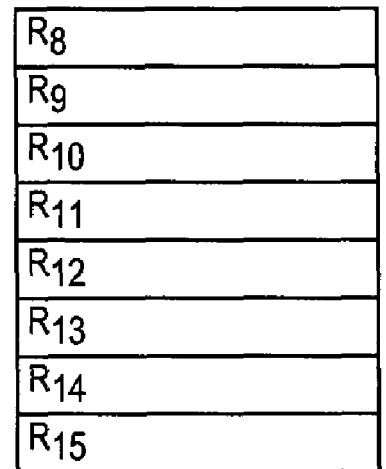
FIG. 1
(PRIOR ART)

| GPR INDICES | PROCESSOR MODE | ENCODED ADDRESS |
|---|---|---|
| $Index_1$ <br> • <br> • <br> $Index_N$ | Mode 1 - Mode K | $ENCODED\ ADDRESS_1$ <br> <br> • |
| $Index_1$ <br> • <br> • <br> $Index_N$ | Mode 1 - Mode K | • |
| • <br> • | | • <br><br> • |
| $Index_1$ <br> • <br> • <br> $Index_N$ | Mode 1 - Mode K | $ENCODED\ ADDRESS_M$ |

MAPPING TABLE 504

FIG. 7

GENERAL PURPOSE
REGISTER (GPR) INDICES
800

| |
|---|
| (0000) $R_0$ |
| (0001) $R_1$ |
| (0010) $R_2$ |
| (0011) $R_3$ |
| (0100) $R_4$ |
| (0101) $R_5$ |
| (0110) $R_6$ |
| (0111) $R_7$ |
| (1000) $R_8$ |
| (1001) $R_9$ |
| (1010) $R_{10}$ |
| (1011) $R_{11}$ |
| (1100) $R_{12}$ |
| (1101) $R_{13}$ |
| (1110) $R_{14}$ |
| (1111) $R_{15}$ |

FIG. 8

MAPPING TABLE 904

| GPR Indices (Registers) | Processor Mode | Encoded Address (memory location) |
|---|---|---|
| (0000) $R_0$<br>(0001) $R_1$<br>(0010) $R_2$<br>(0011) $R_3$<br>(0100) $R_4$<br>(0101) $R_5$<br>(0110) $R_6$<br>(0111) $R_7$ | MODES 1-N | 00000<br>00001<br>00010<br>00011<br>00100<br>00101<br>00110<br>00111 |
| (1000) $R_8$<br>(1001) $R_9$<br>(1010) $R_{10}$<br>(1011) $R_{11}$<br>(1100) $R_{12}$ | MODE 1 | 01000<br>01001<br>01010<br>01011<br>01100 |
| (1101) $R_8$<br>(1110) $R_9$<br>(1111) $R_{10}$<br>(1110) $R_{11}$<br>(1100) $R_{12}$ | MODE 2 | 01101<br>01110<br>01111<br>10000<br>10001 |
| (1100) $R_{15}$<br>(1110) $R_{14}$<br>(1100) $R_{13}$ | MODE 3 | 10011<br>10010<br>10011 |
| (1110) $R_{14}$<br>(1100) $R_{13}$ | MODE 4 | 10100<br>10101 |
| (1110) $R_{14}$<br>(1100) $R_{13}$ | MODE 5 | 10110<br>10111 |
| (1000) $R_8$<br>(1001) $R_9$<br>(1010) $R_{10}$<br>(1011) $R_{11}$<br>(1100) $R_{12}$<br>(1101) $R_{13}$<br>(1110) $R_{14}$<br>(1111) $R_{15}$ | MODE N | 11000<br>11001<br>11010<br>11011<br>11100<br>11101<br>11110<br>11111 |

FIG. 9

MEMORY MAPPED REGISTER FILE AND METHOD FOR ACCESSING THE SAME

CROSS-REFERENCE TO RELATED APPLICATIONS

This application is a continuation of U.S. patent application Ser. No. 10/627,269, filed on Jul. 25, 2003 now U.S. Pat. No. 7,437,532. This application claims the benefit of U.S. Provisional Application No. 60/468,802, filed on May 7, 2003.

FIELD

This invention relates generally to data processing systems and, more particularly, to a memory mapped register file and method for accessing the same.

BACKGROUND

General purpose registers or a "register file" are a useful component of a data processing system's processing architecture. For instance, a microprocessor or central processing unit (CPU) of a data processing system retrieves operands from one or more general purpose registers to execute instructions. The results of the executed instructions are then stored back in one of the general purpose registers. This allows the data processing system to execute instructions more efficiently. Many prior microprocessor architectures operate in different processor modes, and generally use general purpose registers designated, e.g., R0 through R15.

Typically, prior microprocessor architectures, which use such general purpose registers, process instructions in a normal user mode and an exception handling mode, such as an interrupt mode. For example, in the interrupt mode, a user application is halted in response to an interrupt to a processor. Furthermore, in the interrupt mode, access to some general purpose registers is performed through a separate memory unit referred to as "banked registers" in order to improve exception handling processing. That is, in the interrupt mode, different registers in a separate memory unit, i.e., banked registers, are accessed than in the normal mode.

FIG. 1 illustrates "banked registers" for a prior art microprocessor architecture. As shown, in normal mode, a microprocessor (not shown) accesses registers $R_0$ through $R_{15}$ in normal mode general purpose registers 100, whereas, in interrupt mode, the microprocessor accesses only registers $R_8$ through $R_{15}$ in interrupt mode banked registers 102. In this manner, accessing registers in normal mode and interrupt mode requires access to separate memory units. A disadvantage, however, of using banked registers is that it requires a special type of naming scheme to distinguish between the general purpose registers and banked registers, which increases processing overhead. Furthermore, such a general purpose register or "register file" scheme inefficiently accesses registers by requiring access to separate memory units for different processor modes.

Another disadvantage of using the prior art architecture of banked registers is that it does not provide flexibility and efficiency in accessing registers. In particular, the prior art architecture does not allow for aliasing, which is the ability to arbitrarily use the same register across different processor modes. Additionally, the prior art architecture does not allow for fragmentation in which registers can be located in discontinuous locations in memory for access in different processor modes.

There exists, therefore, a need for improved general purpose registers or register files without using separate memory units for register access in different processor modes.

SUMMARY

According to one aspect of the invention, a register file for a data processing system comprises a memory unit, input ports, and output ports. The memory unit includes a plurality of memory locations. Each memory location is addressable by an encoded address, wherein the encoded address corresponds to at least one register and processor mode. The input ports receive inputs for addressing at least one of the memory locations using an encoded address. The output ports output data from at least one of the memory locations addressable by an encoded address.

According to another aspect of the invention, a register file for a data processing system comprises memory means, input means, and output means. The memory means includes a plurality of memory locations. Each memory location is addressable by an encoded address, wherein the encoded address corresponds to at least one register means and processor mode. The input means receive inputs for addressing at least one of the memory locations using an encoded address. The output means output data from at least one of the memory locations addressable by an encoded address.

According to another aspect of the invention, a data processing system comprises a processor to process instructions and a plurality of pipeline stages to execute instructions. The pipeline stages include a register file. The register file includes a memory unit, input ports, and output ports. The memory unit includes a plurality of memory locations. Each memory location is addressable by an encoded address, wherein the encoded address corresponds to at least one register and processing mode. The input ports receive inputs for addressing at least one of the memory locations using an encoded address. The output ports output data from at least one of the memory locations using an encoded address.

According to another aspect of the invention, a data processing system comprises processing means for processing instructions that includes pipeline means for executing instructions. The pipeline means includes register file means. The register file FINNEGAN means includes a memory means, input means, and output means. The memory means includes a plurality of memory locations. Each memory location is addressable by an encoded address, wherein the encoded address corresponds to at least one register means and processing mode. The input means receive inputs for addressing at least one of the memory locations using an encoded address. The output means output data from at least one of the memory locations using an encoded address.

According to another aspect of the invention, a processor comprises an integrated circuit that includes a memory unit and at least one address encoder. The memory unit includes a plurality of memory locations. Each memory location is addressable by an encoded address, wherein the encoded address corresponds to at least one register and processor mode. Each address encoder provides at least one encoded address for addressing at least one of the memory locations.

According to another aspect of the invention, a data processing system comprises a memory mapped register file for accessing a plurality of memory locations. Each memory location is addressable by an encoded address, wherein the encoded address corresponds to at least one register and processor mode.

According to another aspect of the invention, a processor comprises circuit means the includes memory means and addressing means. The memory means includes a plurality of memory locations. Each memory location is addressable by an encoded address, wherein the encoded address corresponds to at least one register means and processor mode. Each addressing means provides at least one encoded address for addressing at least one of the memory locations.

According to another aspect of the invention, an integrated circuit method FINNEGAN comprises configuring the integrated circuit to receive inputs; configuring the integrated circuit to determine an encoded address based on the received inputs, wherein the encoded address corresponds to at least one register and processor mode; configuring the integrated circuit to access a register using an encoded address; and configuring the integrated circuit to output data from the accessed register.

According to another aspect of the invention, a method for accessing a memory unit having a plurality of memory locations, the method comprises receiving a memory request for accessing the memory unit, the memory request including a register index input and a processor mode input; encoding the register index input and processor mode input to obtain an encoded address; accessing at least one of the memory locations of the memory unit in accordance with the encoded address, wherein the encoded address corresponds to at least one register and processor mode; and writing data into or reading data from the accessed memory location.

According to another aspect of the invention, a memory unit comprises a plurality of memory locations addressable by encoded addresses, wherein each encoded address corresponds to at least one register and processor mode.

DESCRIPTION OF THE DRAWINGS

The accompanying drawings, which are incorporated in and constitute a part of the specification, illustrate exemplary implementations and embodiments of the invention and, together with the detailed description, serve to explain the principles of the invention. In the drawings, FIG. 1 illustrates banked registers for a prior art microprocessor architecture;

FIG. 7 illustrates a block diagram of one example of a mapping table for the address encoder of FIG. 5;

FIG. 8 illustrates a block diagram of one examples of sixteen indices corresponding to sixteen general purpose registers;

FIG. 9 illustrates a diagram of one example of a mapping table for the indices of FIG. 8;

DETAILED DESCRIPTION

Figure 2:
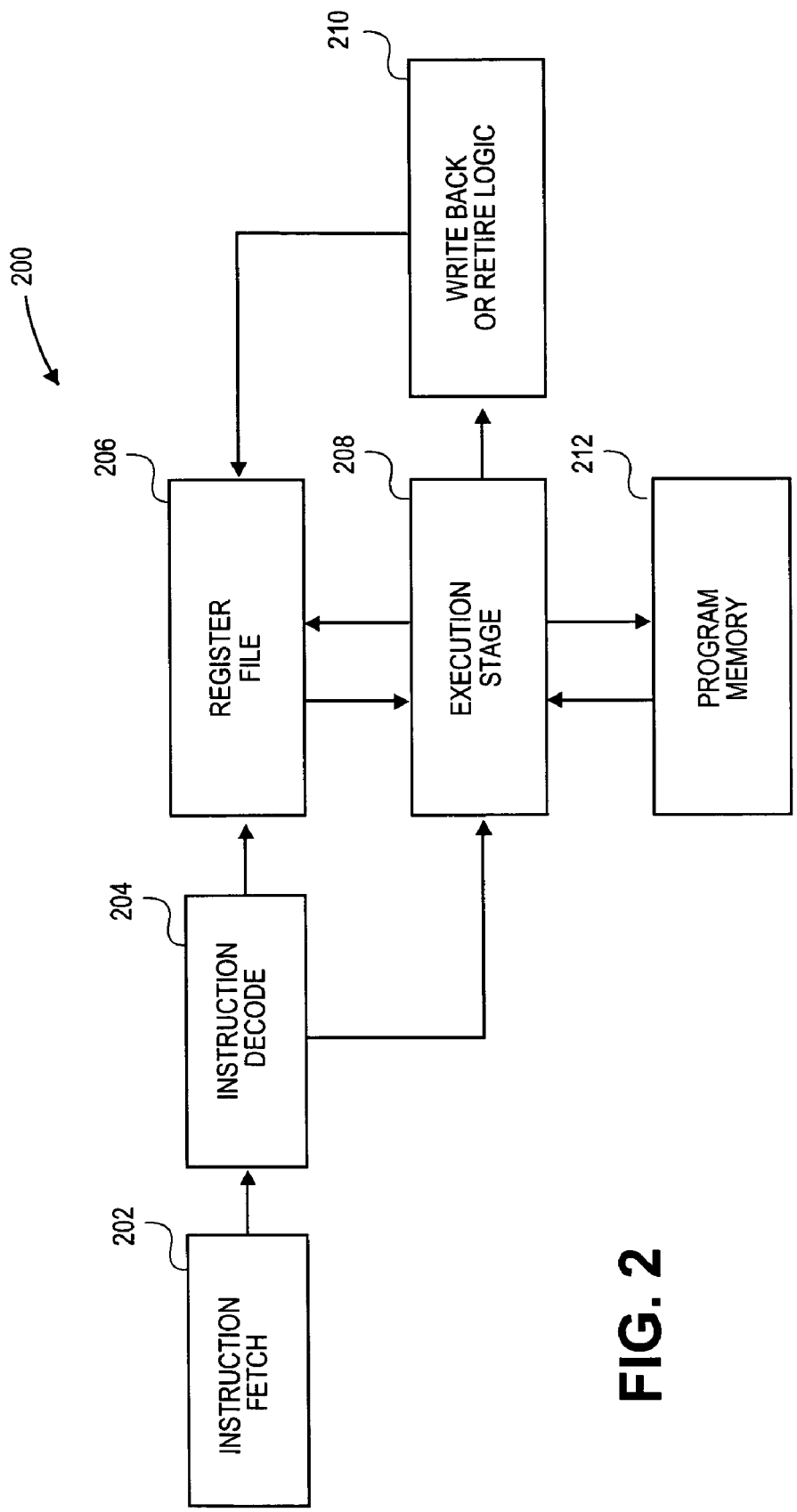
FIG. 2 illustrates one example of a data processing system having a pipeline microprocessor architecture with a register file.

Reference will now be made in detail to exemplary implementations and embodiments of the invention, examples of which are illustrated in the accompanying drawings. Wherever possible, the same reference numbers will be used throughout the drawings to refer to the same or like parts.

A memory mapped register file is disclosed that overcomes disadvantages of prior register files and provides a more flexible and efficient manner of accessing registers in a register file of a data processing system that can operate in multiple processor modes. According to one example, a register file for a data processing system includes a memory unit, input ports, and output ports. The memory unit includes a plurality of memory locations. Each memory location is addressable by an encoded address, wherein the encoded address corresponds to at least one register and processor mode. The input ports receive inputs for addressing at least one memory location using an encoded address. The output ports output data from at least memory location addressable by an encoded address. In this manner, a register is addressable and thus accessible by using the memory location addressable by the corresponding encoded address.

Thus, memory locations (corresponding to respective registers) can be accessed in the memory unit of the register file for different processor modes without using separate memory units such as "banked registers." By avoiding banked registers use, a more efficient manner of accessing registers in the register file can be achieved. Processing overhead is also improved by making each register (i.e., memory location) of the memory unit addressable by an encoded address without requiring a special naming scheme for accessing registers in separate banked registers for different processor modes.

Additionally, addressing techniques disclosed herein allow for flexible and efficient use of memory in the register file for accessing memory registers across different processor modes. In one example, the registers in the register file can be aliased to achieve convenient addressing of registers in limited memory space. For instance, aliasing allows the same register to be used in the memory unit of the register file across different processor modes. Thus, aliasing allows for sharing of data in an aliased register without having to transfer data between processor modes. In addition, aliasing allows a limited number of registers to be used for a data processing system operating in different processor modes.

In other examples, registers can be fragmented within the register file such that registers for one particular processor mode are isolated and not used in other processor modes. This is particularly useful when operating in a less frequent processing mode such as emulation mode of a processor Addressing techniques disclosed herein also allow for registers to be scalable to any bit width without requiring extensive redesign of the register file. In particular, regardless of the bit width of the register, registers in the register file are addressable by the same encoded addresses, thus allowing for increased flexibility of a register file.

In the following description, reference to a "memory mapped register file" is a register file having a memory unit with a plurality of registers corresponding to memory locations addressable by an encoded addresses, wherein each encoded address corresponds to at least one register and processor mode. Thus, a "register" is also addressable by the encoded address to its corresponding memory location. Such a register file can be implemented for various types of microprocessor architectures that require access to registers in different processor modes.

FIG. 2 illustrates one example of a data processing system 200 having a pipeline microprocessor architecture with a register file 206. The pipeline architecture processes instructions in multiple stages. Data processing system 200 includes a pipeline comprising an instruction fetch stage 202, an instruction decode stage 204, a register file 206, an execution stage 208, and a write back or retire logic stage 210. Data processing system 200 also includes a program memory 212 that stores instruction data used by execution stage 208. In this example, the pipeline stages and memory can be implemented as an integrated circuit (IC) using any combination of circuits, components, memory devices, and bus lines.

As will be described in further detail below, register file 206 is a memory mapped register file having a memory unit with a plurality of registers corresponding to memory locations addressable by an encoded address. Each encoded address corresponds to at least one register and processor mode. Register file 206 also allows for aliasing and fragmentation of registers in order to improve efficiency and flexibility for register accessing.

Figure 3:
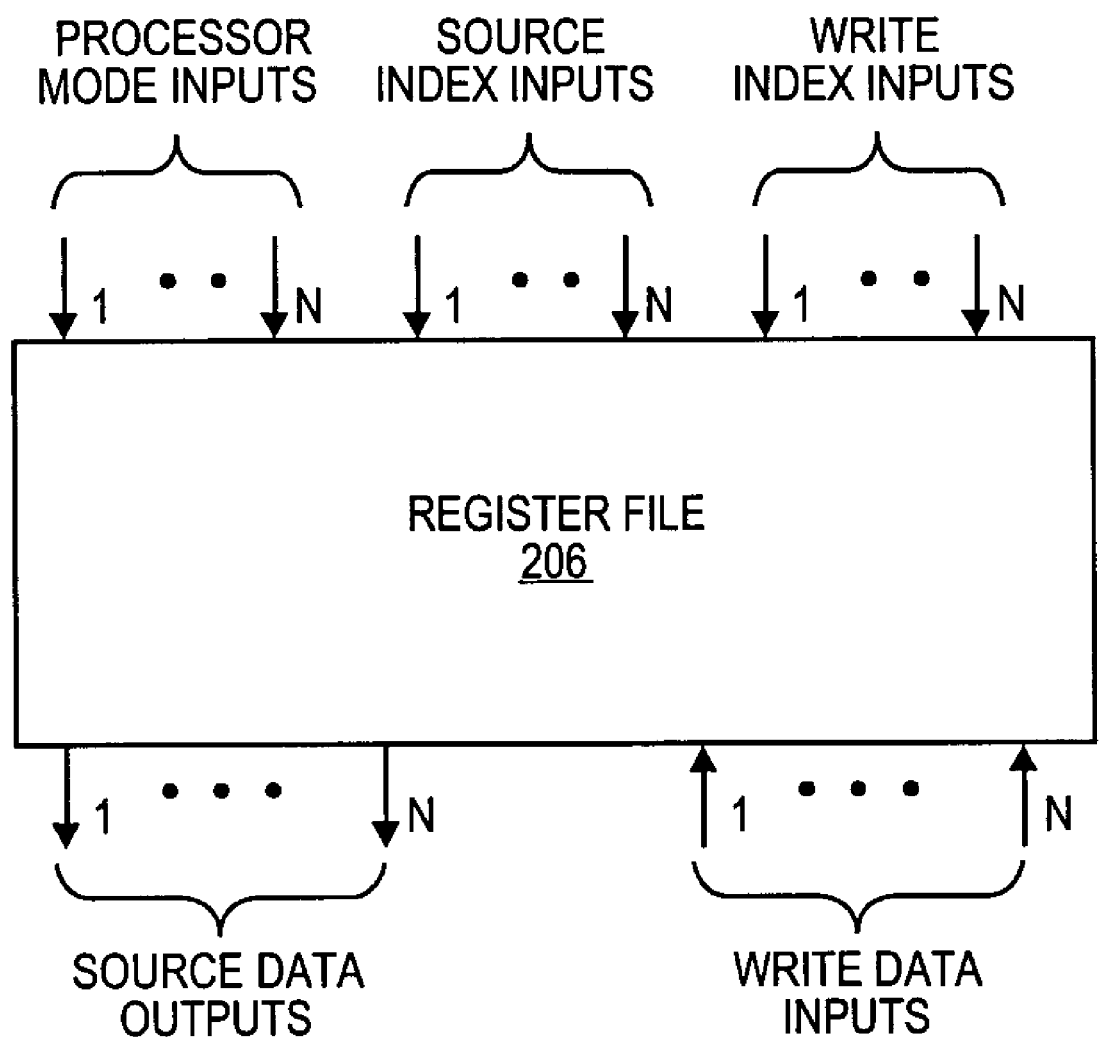
FIG. 3 illustrates in block diagram form one example of inputs and outputs for the register file of FIG. 2.

Instruction fetch stage 202 fetches the current instruction from a memory, e.g., an instruction buffer (not shown) or program memory 212, and forwards the instruction to instruction decode stage 204. Stage 204 decodes the instruction and sends inputs to register file 206 to access instruction data in appropriate registers. The accessed instruction data is sent to execution stage 208 in order for execution stage 208 to process the instruction. FIG. 3 illustrates in block diagram form one example of inputs and output for register file 206. Thus, referring also to FIG. 3, for example, instruction decode stage 204 sends "processor mode inputs" and "source index inputs" to register file 206. Register file 206 uses the inputs from instruction decode stage 204 to obtain an encoded address for accessing the desired register within register file 206 in order to execute the instruction. Thus, data from the register addressable by the encoded address is forwarded to execution stage 208.

Moreover, the "processor mode inputs" and "write index inputs" can be sent to register file 206 by other components or control circuitry (not shown) to write data into a desired register within register file 206. For example, data received at "write data inputs" can be written into register 206 at an encoded address derived from the "processor mode inputs" and "write index inputs." This allows write back or retire logic 210 to send data for storage in register file 206 via the "write index inputs." The manner in which these inputs are used by register file 206 to obtain an encoded address is described in further detail below.

Execution stage 208 can include any number of instruction execution units. Examples of execution units include arithmetic logic units (ALUs), load/store units, multiply and accumulate units (MACs), etc. Execution stage 208 also operates with program memory 212 to execute instructions. For example, for a load/store operation, execution stage 208 can store data into program memory 212 after processing an instruction using a load/store execution unit. In one example, instructions can be issued to execution stage 208 in-order and executed out-of-order. For data processing system 200, results of the instructions are retired in-order to register file 206.

Thus, in this example, execution stage 208 can forward data from executed instructions ("results data") to write back or retire logic 210 ("logic 210"). Logic 210 can forward results data back to register file 206 for storage. In particular, logic 210 writes back results of executed instructions from execution stage 208 to register file 206. Additionally, execution stage 208 can execute instructions out-of-order by using a re-order buffer. In one example, retire logic 120 includes a re-order buffer and retires instruction data in the reorder buffer by sending the data to register file 206 for storage. The required data can then be used by subsequent instructions. As further explained below, register file 206 includes a plurality of write ports to receive write data (instruction data) from logic 210. Accordingly, logic 210 can retire one or more results (instruction data) for executed instructions in a same cycle such that the results are stored in register file 206.

With further reference to FIG. 3, register file 206 is scalable to receive any number of inputs and output any number of outputs. Thus, in the example shown in FIG. 3, register file 206 includes four sets of input ports to receive processor mode inputs, source index inputs, write index inputs, and write data inputs. Each set of input ports receives a plurality of inputs (input 1 through input N). Register file 206 also includes a set of output ports to output source data outputs (output 1 through output N). In this example, register file 206 can receive inputs and provide outputs for a multiple issue data processing system. Specifically, register file 206 is capable of outputting and storing data for multiple instructions in a same cycle.

For example, if two instructions require two ALU operations and each operation requires two source data inputs from register file 206, register file 206 can receive four processor mode inputs and four source index inputs in a same cycle to access and output data from four registers as source data outputs. This capability assumes there are no data dependencies, e.g., the second ALU operation does not require the result of the first ALU operation as an input. In particular, if the first ALU operation is A+B and the second ALU operation is C+D and the operand data for A through D is stored in four different registers of register file 206, N=4 for the number of inputs and outputs for register file 206. Accordingly, register file 206 uses processor mode inputs 1 through 4 and source index inputs 1 through 4 to obtain encoded addresses for accessing the four registers holding the operand data A through D in register file 206 in order to output the operand data as source outputs 1 through 4.

Similarly, if two instructions can be retired from retire logic 210, register file 206 can store data from the two retired instructions in a same cycle through write data input 1 and write data input 2. For example, register file 206 uses processor mode input 1 and write index input 1 to obtain an encoded address for the register storage location within register file 206 for data received at write data input 1. In addition, register file 206 uses processor mode input 2 and write index input 2 to obtain an encoded address for the register storage location within register file 206 for data received at write data input 2. The manner of processing the above inputs and outputs is explained in further detail below.

Figure 4:
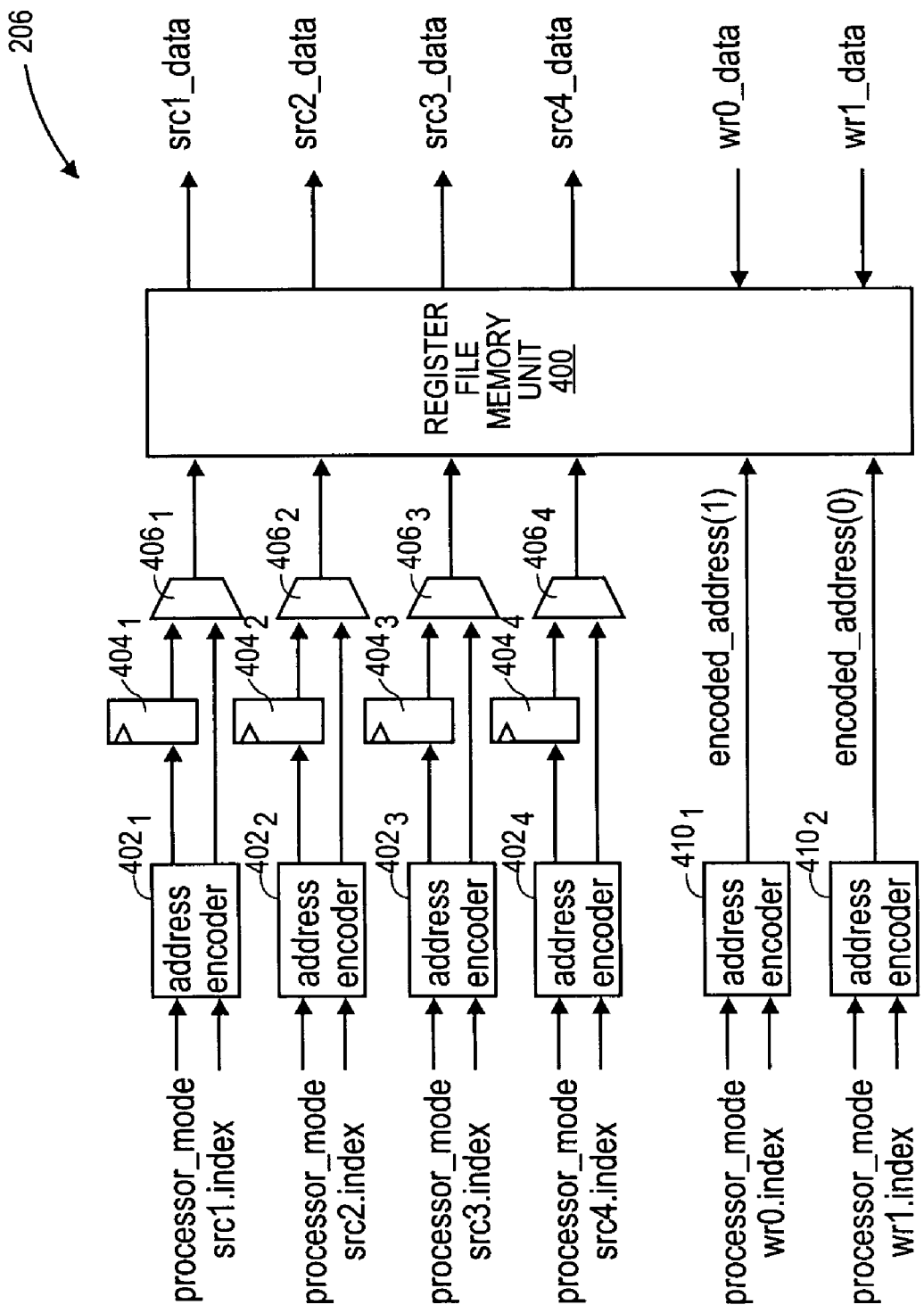
FIG. 4 illustrates a detailed circuit diagram of one example of the register file of FIG. 3.

FIG. 4 illustrates a detailed circuit diagram of one example of register file 206 of FIG. 3. In this example, register file 206 can operate in a multiple issue data processing system, more specifically, a dual issue data processing system. As shown, register file 206 includes a register file memory unit 400, a plurality of source address (read) encoders $402_1$ through $402_4$, and (write) address encoders $410_1$ and $410_2$. As described in further detail below, each of the encoders $402_1$ through $402_4$, $410_1$, and $410_2$ include mapping control logic for obtaining an encoded address using a mapping table, based on a processor mode and source index input, to access a register (or memory location) in register file memory unit 400.

Register file memory unit 400 ("memory unit 400") is a single memory unit, examples of which include a static random access memory (SRAM) or a plurality of flip-flops. Memory unit 400 is scalable and capable of having any arbitrary size containing, e.g., 16, 32, 48, or 64 registers, each capable of being addressed by an encoded address. Each register in memory unit 400 represents a general purpose register for access in particular processor mode and is addressable by an encoded address. In one example, an encoded address maps to an index referring to a general purpose register for access in a particular processor mode, as explained in further detail below.

Additionally, each register is capable of having any arbitrary bit width size. For example, each register can be 32-bits wide or 64-bits wide. Because memory unit 400 is a single memory unit, the widths can be adjusted without affecting the encoded addressing scheme for memory unit 400. This minimizes extensive redesign if using different widths for memory unit 400. In other words, regardless of the bit width size, each register can be addressable by the same encoded address using the same encoded addressing scheme. This allows register file 206 to be expandable for 32-bit or 64-bit architectures with minimal redesign in which an efficient and simple encoded addressing scheme is used.

Read encoders $402_1$ through $402_4$ receive processor_mode inputs and src1.index through src4.index inputs, respectively, and write encoders $410_1$ and $410_2$ receive processor_mode inputs and wr1.index and wr2.index inputs. Read encoders $402_1$ through $402_4$ map a source general purpose register index (via the index inputs) to an encoded address during a particular processor mode using a mapping control logic and mapping tables described below. The encoded address is used for accessing data in a specific register in memory unit 400 during the particular processor mode and to output the data as source data for executing instructions. In this example, memory unit 400 can output a plurality of source data (src1_data through src4_data) for at least two instructions.

Read encoders $402_1$ through $402_4$ can either latch the encoded addresses in associated latches $404_1$ through $404_4$, respectively, or directly output encoded addresses to associated selectors $406_1$ through $406_4$, respectively, that also receive as inputs the output of latches $404_1$ through $404_4$. Latches $404_1$ through $404_4$ latch resultant encoded addresses for pipeline storage of the encoded address in the case that data for an instruction can be reused at the register or storage location of the latched encoded address. Selectors $406_1$ through $406_4$ select either the encoded address directly from the associated address encoders or from the associated latches in response to a signal (not shown) generated by the instruction decode stage 204. In one example, if one of the selectors $406_1$ through $406_4$ selects an encoded address from the associated read address encoder, the encoded address is also latched for pipeline storage. In this manner, the encoded address, as opposed to the source index, is latched for pipeline storage, thereby providing further processing efficiency.

Likewise, write encoders $410_1$ and $410_2$ map a write index (via write index inputs) to an encoded address during a particular processor mode using a mapping control logic and mapping tables described below. The encoded address is used for accessing a specific register in memory unit 400 during the particular processor mode to store data associated with an executed instruction. In this example, a plurality of write data (wr0_data and wr1_data) can be written or stored into memory unit 400. For example, if two instructions can be retired or written back, wr0_data and wr1_data can be written or stored in memory unit 400 in a same cycle. Memory unit 400 can be scalable to have any number of FINNEGAN write ports to which any number of data can be written or stored in memory unit 400 of register file 206.

The mapping control logic and various examples of mapping tables for obtaining encoded addresses for accessing registers in memory unit 400 of register file 206 will now be described. Such mapping logic and mapping tables for obtaining encoded addresses are used by encoders $402_1$ and $402_4$, and $410_1$ and $410_2$ described above.

Figure 5:
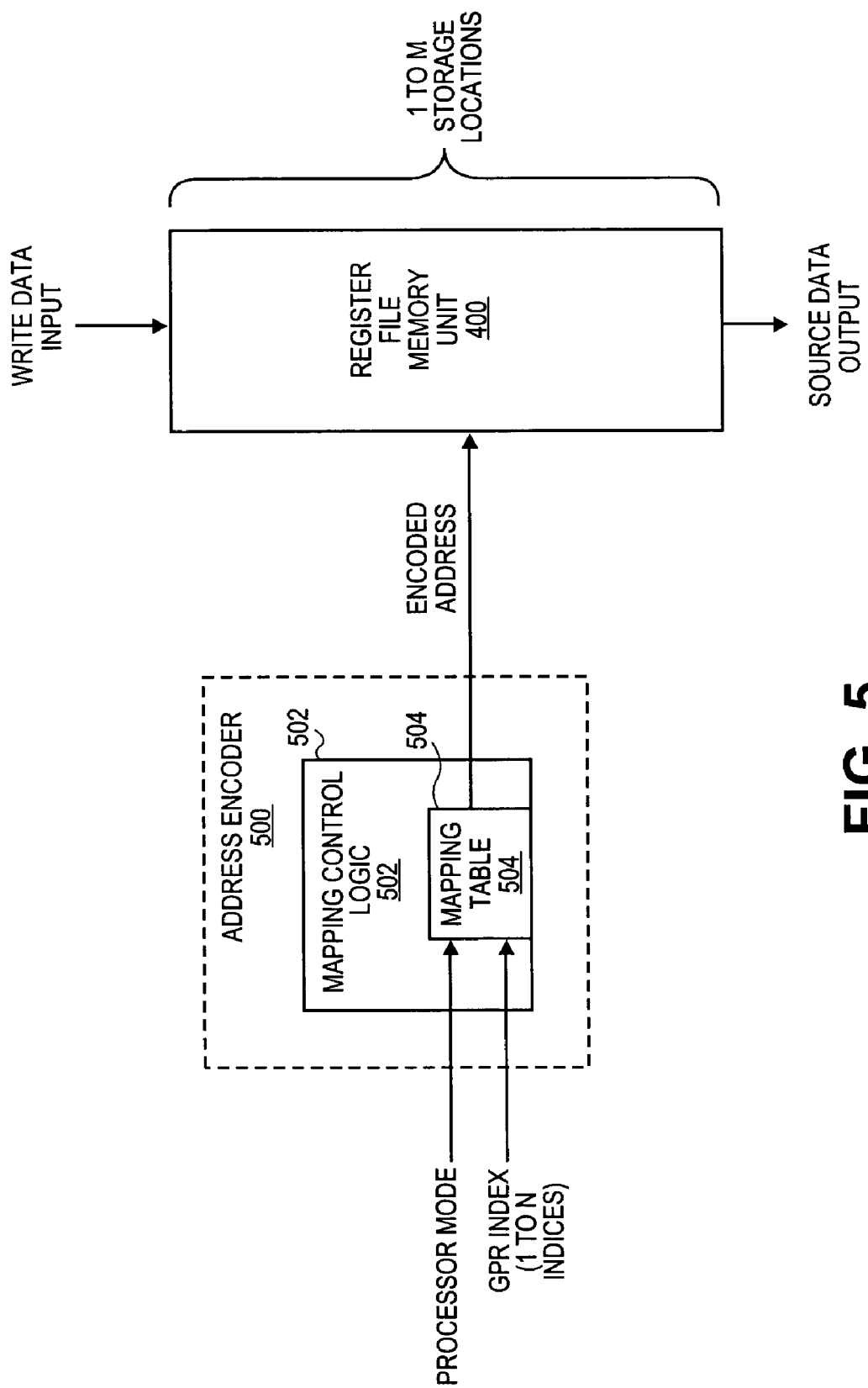
FIG. 5 illustrates a block diagram of one example of an address encoder with mapping control logic and a mapping table for obtaining an encoded address to access a register or storage location in the register file of FIG. 4.

FIG. 5 illustrates a block diagram of one example of an address encoder 500 with a mapping control logic 502 and a mapping table 504 for obtaining encoded addresses to access registers or storage locations in memory unit 400 of FIG. 4. By using mapping control logic 502 and mapping table 504 to obtain encoded addresses for registers in memory unit 400, a more flexible, efficient, and convenient manner of accessing registers across different processor modes can be achieved. In the following examples, mapping control logic 502 and mapping table 504 can be implemented as circuitry, examples of which include programmable gate arrays (PGAs), field programmable gate arrays (FPGAs), or other like circuitry to obtain certain outputs based on varying inputs, as described below.

Figure 6:
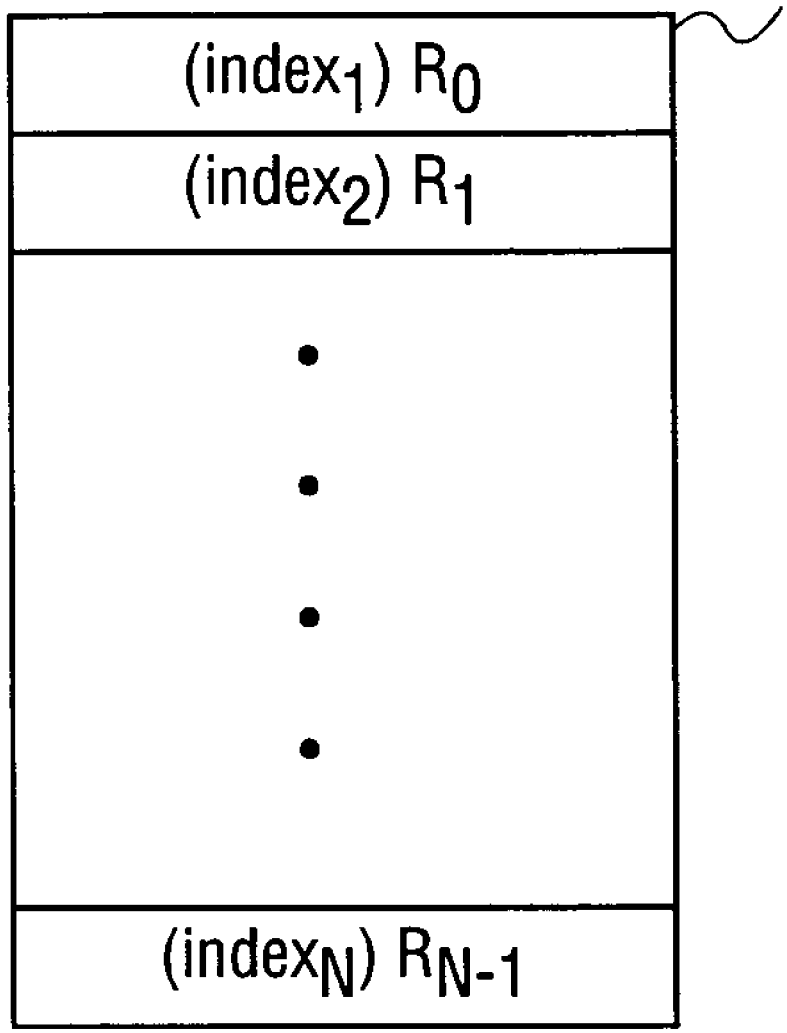
FIG. 6 illustrates a block diagram of one example of indices corresponding to general purpose registers.

Address encoder 500 can be representative of any one of encoders $402_1$ through $402_4$, and $410_1$ and $410_2$. In this example, latches and selectors are not shown for purposes of explanation. As shown in FIG. 5, mapping control logic 502 receives a processor mode input and a general purpose register (GPR) index input that correspond to the processor_mode inputs and (src.index and wr.index inputs), respectively, shown in FIG. 4. The GPR index input is capable of receiving 1 to N different indices that correspond to general purpose registers $R_0$ through $R_{N-1}$. For example, referring to FIG. 6, a block diagram is shown of one example of general purpose register (GPR) indices 600 ($index_1$ to $index_N$) corresponding to a plurality of general purpose registers ($R_0$ to $R_{N-1}$).

Mapping control logic 502 can thus receive an index, e.g., $index_1$, that indicates that general purpose register $R_0$ is to be accessed. Mapping control logic 502 can also receive a processor mode, e.g., mode 1, that indicates register $R_0$ for processor mode 1 is to be accessed in a corresponding register of memory unit 400. Mapping control logic 502 uses mapping table 504 that maps GPR indices for various processor modes to encoded addresses, which are used to access a corresponding register in memory unit 400 of register file 206. For example, referring to FIG. 7, a block diagram of one example of mapping table 504 is shown. In mapping table 504, any arbitrary number of GPR indices ($index_1$ to $index_N$) can be mapped to any arbitrary number of encoded addresses (encoded $address_1$ to encoded $address_M$) for any number of processor modes (mode 1 to mode K).

After receiving the processor mode input and GPR index input, mapping control logic 502 obtains the appropriate encoded address using mapping table 504. In this process, inputs are provided to mapping table 504, which can include programmable hardware circuitry, to obtain a desired output (i.e., encoded address). The obtained encoded address is outputted to memory unit 400 in register file 206 in order to access a desired register. Depending on whether data is to be inputted or outputted, the register addressable by the obtained encoded address is accessed and data is either stored or outputted, accordingly. In this example, N is =, <, or > than M, wherein N and M are integers.

More particularly, memory unit 400 can have less registers than the number of indices, which allows for efficient use of memory space. For instance, each encoded addressable memory location register in memory unit 400 is capable of mapping to multiple indices or registers for access in different processor modes. Furthermore, memory unit 400 can have the same or more registers than the number of GPR indices to provide fragmentation of registers in memory unit 400. For instance, registers in memory unit 400 addressable by an encoded address can be discontinuous and scattered throughout memory unit 400. Fragmentation is useful, e.g., when operating in emulation mode, such that registers can be isolated when not operating in normal modes. These features are explained in further detail below.

FIG. 8 illustrates a block diagram of one example of sixteen GPR indices 800 corresponding to sixteen general purpose registers ($R_0$ to $R_{15}$) for use by a data processing system or processor. These registers are associated with register indices ranging from 0000 to 1111 for the sixteen registers. In one example, the sixteen register indices (0000 to 1111) map to thirty-two encoded addresses (00000 to 11111) for addressing thirty-two registers in memory unit 400 across different modes.

For example, referring to FIG. 9, a diagram is shown of one example of a mapping table 904 for the sixteen GPR indices 800 of FIG. 8 mapping to thirty-two encoded addresses. Mapping table 904 contains thirty-two encoded addresses that map to sixteen GPR indices for processor modes 1 through N. In particular, each encoded address maps to one of the indices ranging from 0000 to 1111 based on at least one processor mode. Mapping table 904 thus allows a single memory unit, e.g., memory unit 400, to be used for accessing registers designated for different processor modes using the encoded addresses.

This map can be used by encoders to obtain encoded addresses using register index inputs and processor mode inputs for accessing thirty-two registers in memory FINNEGAN unit 400 of register file 206. This example, shown in FIG. 9, is based on data processing system 200 operating in N different processor modes. For example, mode 1 can be designated as a user mode and mode 2 can be designated as an interrupt mode. Modes 3 through 7 can be designated for other types of modes such as various exception handling modes.

As illustrated in mapping table 904, registers $R_0$ through $R_7$ associated with indices ranging from 0000 to 0111 map to 5-bit encoded addresses ranging from 00000 to 00111. In this manner, accessing general purpose registers $R_0$ through $R_7$ is performed by accessing the registers in memory unit 400 addressable by encoded addresses ranging from 00000 to 00111. Moreover, accessing register $R_1$ associated with modes 1-N is performed by accessing the register corresponding to the memory location in memory unit 400 addressable by encoded address 00001. For accessing general purpose registers $R_8$ through $R_{12}$ in mode 1, the registers corresponding to the memory locations addressable by the encoded addresses ranging from 01000 to 01100 are used. For accessing general purpose registers $R_8$ and $R_{12}$ in mode 2, the registers corresponding to the memory locations addressable by the encoded addresses ranging from 01101 to 10001 are used. A similar technique is used for accessing registers for modes 3 through N in memory unit 400 of register file 206, as shown in FIG. 9.

Thus, unlike prior art register files, register file 206 uses a single memory unit to access registers across different processor modes. The registers and their corresponding memory locations are addressable by an encoded address corresponding to respective registers and processor modes. As a result, registers used for various processor modes can be accessed using a single memory unit without using "banked registers."

Figure 10A:
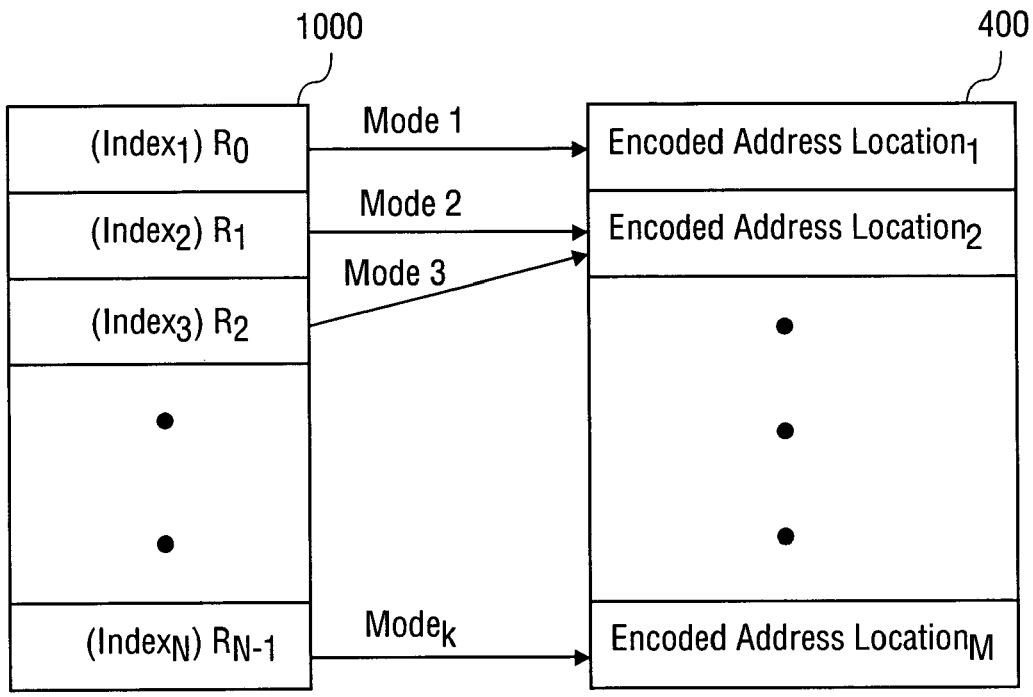
FIG. 10A illustrates a diagram of one example of aliasing registers in the register file of FIG. 4.
Figure 10B:
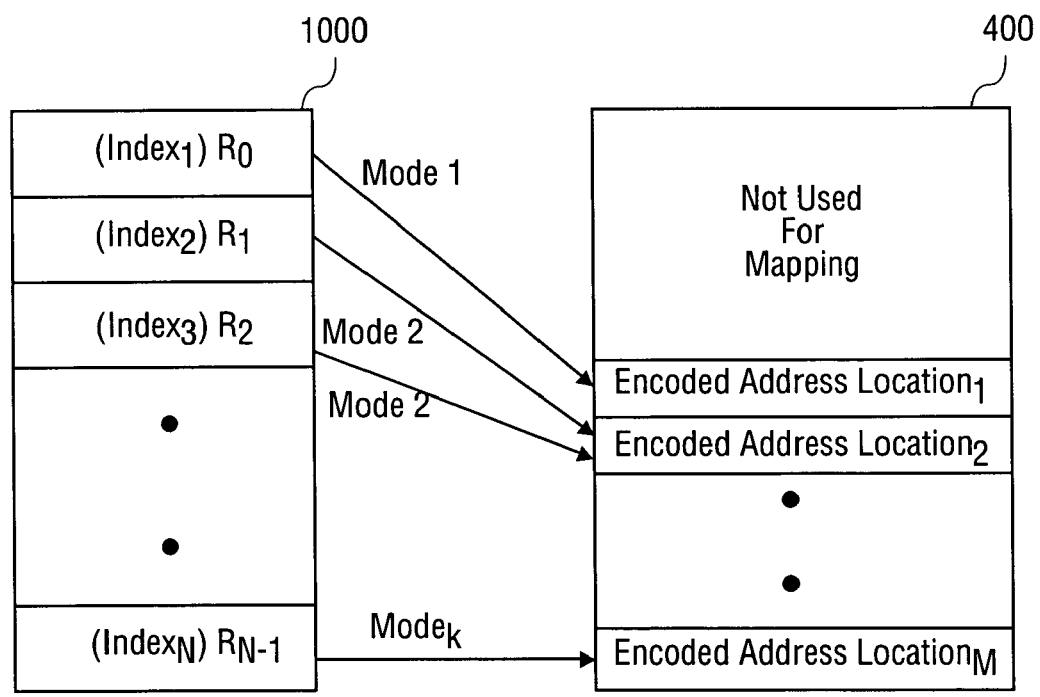
FIG. 10B illustrates a diagram of one example of aliasing and fragmenting the registers in the register file of FIG. 4.
Figure 10C:
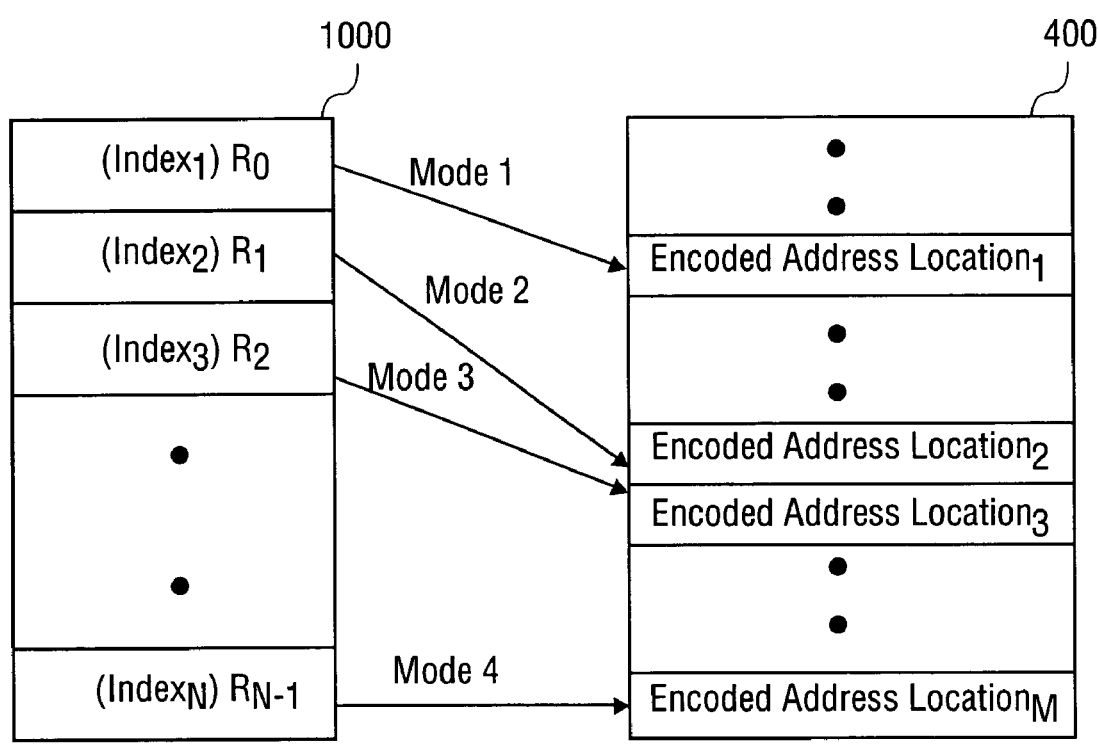
FIG. 10C illustrates a diagram of another example of fragmenting the FINNEGAN registers in the register file of FIG. 4.

Further examples of mapping tables are shown in FIGS. 10A-10C mapping 1 to N GPR indices to 1 to N−1 registers in 1 to M encoded address locations. In the following examples, N=, >, or < than M, wherein N and M are integers. FIG. 10A illustrates one example of aliasing registers in memory unit 400 of register file 206. Aliasing allows multiple GPR indices to map to the same register in memory unit 400 of register file 206. As shown, $index_1$ corresponding to register $R_0$ maps to encoded address $location_1$ in memory unit 400 and $index_2$ and $index_3$ corresponding to registers $R_1$ and $R_2$ map to the same encoded address $location_2$ in modes 2 and 3, respectively.

Aliasing allows for efficient use of memory space in memory unit 400 and provides a convenient manner of addressing registers in memory unit 400. For instance, data stored in encoded address $location_2$ can be shared between modes 2 and 3 without a data transfer taking place into encoded address $location_2$. Furthermore, because indices 2 and 3 for processor modes 2 and 3, respectively, map to the same register at encoded address $location_2$, a single register for two different processor modes can be used instead of requiring two separate registers. The mapping tables for aliasing described herein thus provide a simple manner of associating encoded addresses to GPR indices across different processor modes.

FIG. 10B illustrates one example of aliasing and fragmenting registers in memory unit 400 of register file 206. Fragmentation allows for GPR indices to map to registers that are discontinuous in memory unit 400. As shown, $index_1$ corresponding to register $R_0$ maps to encoded address $location_1$ in memory unit 400 and $index_2$ and $index_3$ corresponding to registers $R_1$ and $R_2$ for mode 2 map to the same register at encoded address $location_2$. In this example, the top portion of memory unit 400 is not used for mapping encoded addresses to GPR indices. This unused portion of memory unit 400 can be used for other purposes within the data processing system or processor.

Fragmentation also allows for flexible use of memory space within memory unit 400. In particular, during less often used modes, such as an emulation mode, it may be desirable for the data processing system or processor to use different registers not used by other modes. In this manner, data in the registers for the other modes are not destroyed. For instance, as shown in FIG. 10C, mode 1 may be an emulation mode, such that $index_1$ corresponding to register $R_0$ maps to the register in memory unit 400 at encoded address location. Encoded address $location_1$ is isolated or fragmented from the next register at encoded address $location_2$ and encoded address $location_3$.

Figure 11:
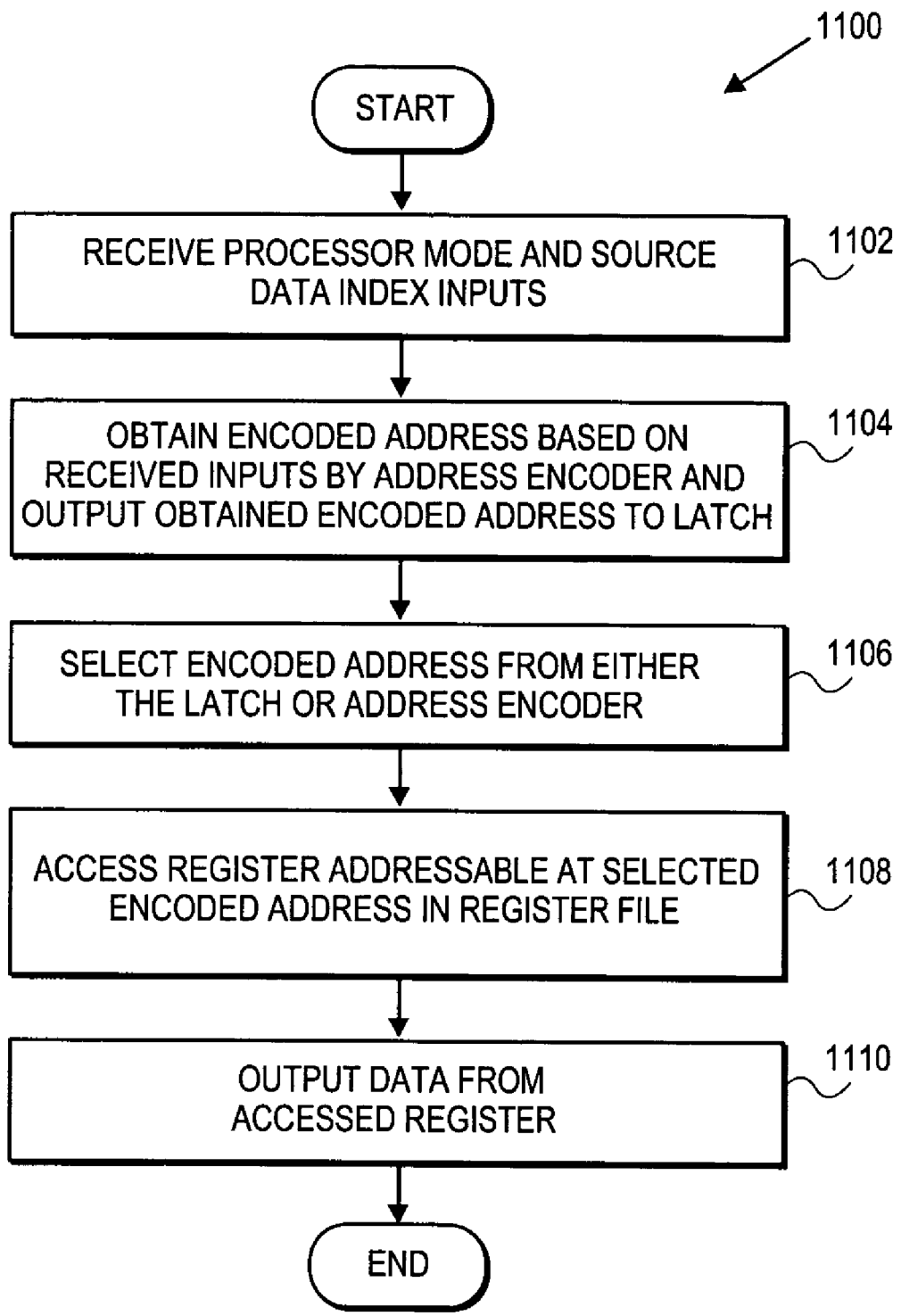
FIG. 11 illustrates one example of a flow diagram for a method to output source data from the register file of FIG. 4.

FIG. 11 illustrates one example of a flow diagram for a method 1100 to output source data from register file 206 of FIG. 4 using mapping table 904 as shown in FIG. 9. Initially, processor mode and source data index inputs are received (step 1102). For example, if an ALU instruction is to be executed in mode 2 that needs values A and B from general purpose registers $R_8$ and $R_9$, the processor mode input would be "mode 2" and the source data index inputs (src1.index and src2.index) would be 1000 and 1001 for registers $R_8$ and $R_9$.

Next, an encoded address is obtained based on the received inputs by an address encoder (using mapping table 904) to output the obtained encoded address to a latch (step 1104). Using the example of memory map 904 above, a source index 1000 maps to encoded address 01000 and source index 1001 maps to encoded address 01001. A selector selects the encoded address stored in the latch or from the address encoder directly (step 1106). For instance, selectors $406_1$ and $406_2$ can select encoded addresses (01000 and 01001) from either latches $404_1$ and $404_2$, respectively, or address encoders $402_1$ and $402_2$ directly in which the encoded addresses are outputted to memory unit 400. The register addressable by the outputted encoded address is accessed in memory unit 400 (step 1108). In particular, registers $R_8$ and $R_9$ can be addressed using the encoded addresses 01000 and 01001 to access and obtain data from registers $R_8$ and $R_9$. Finally, the data A and B at the addressed register are outputted (step 1110). That is, the data A and B stored in registers $R_8$ and $R_9$ at encoded addresses 01000 and 01001 are outputted as src1_data and src2_data from memory unit 400 to execution stage 204 to execute the ALU operation.

The method shown in FIG. 11 can also be implemented for multiple instructions in which four registers are accessed, assuming there are no data dependencies. For example, if two ALU instructions are required needing values A through D stored in registers $R_8$ through $R_{11}$ for mode 2, the address encoders $402_1$ through $402_4$ obtain the encoded addresses 01000 through 01011 from the source indices 1000 through 1011 for registers $R_8$ through $R_{11}$. The data values A through D at storage locations addressable by the encoded addresses are outputted as src1_data through src4_data.

Figure 12:
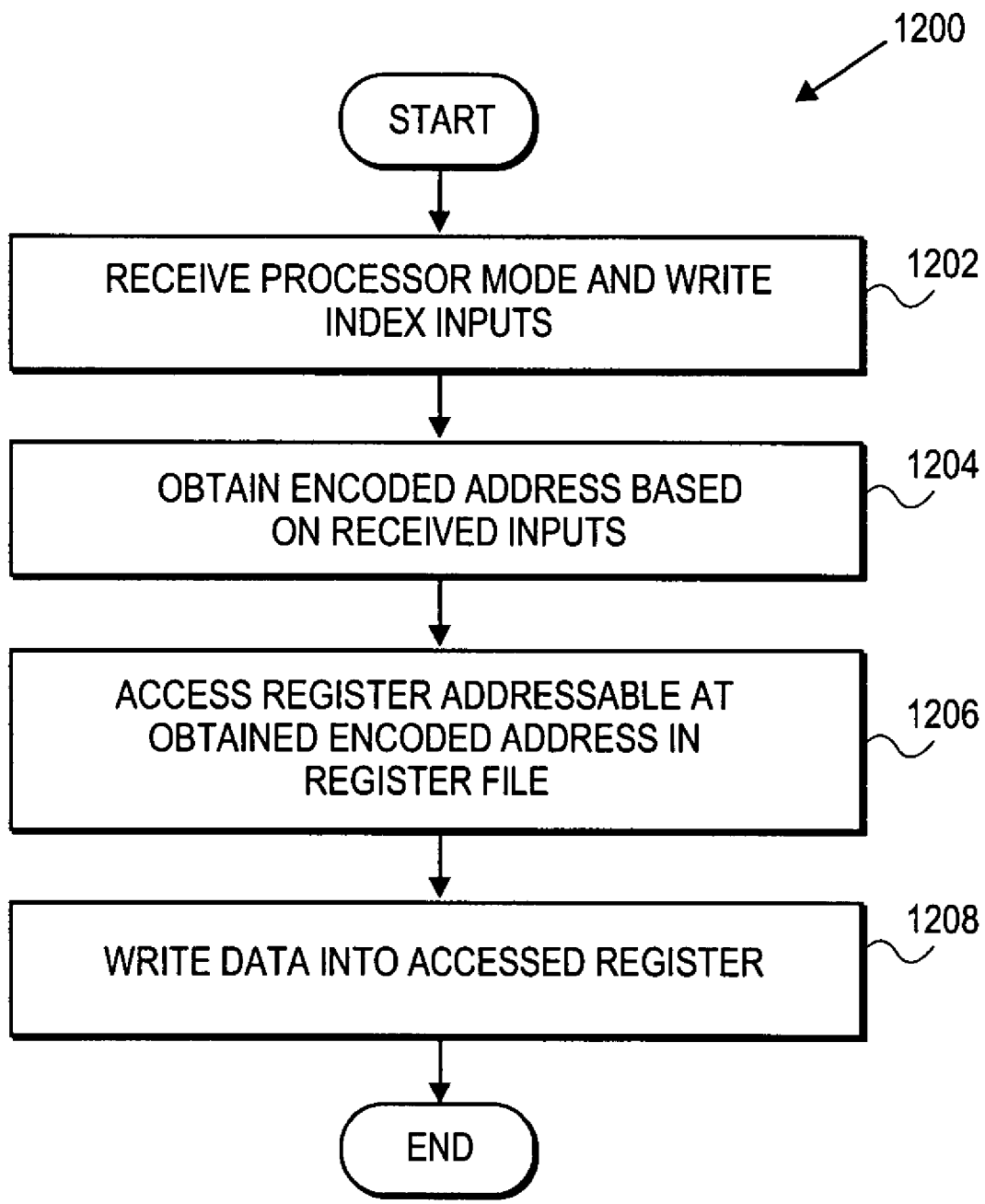
FIG. 12 illustrates one example of a flow diagram for a method to write data into the register file of FIG. 4.

FIG. 12 illustrates one example of a flow diagram for a method 1200 to write data into register file 206 of FIG. 4 using mapping table 904 as shown in FIG. 9. Initially, processor mode and write index inputs are received (step 1202). In method 1200, wr0_data and wr1_data received at write input ports are to be written into two registers ($R_8$ and $R_9$) of register file memory unit 400 during mode 2. Thus, the processor mode input would be "mode 2" and the wr0.index would be 1000 and the wr1.index would be 1001.

Next, an encoded address is obtained based on the received inputs (step 1204). Using the example of memory map 904 above, wr0.index of 1000 maps to encoded address 01000 and wr1.index of 1001 maps to encoded address 01001. The register addressable by the encoded address is accessed in memory unit 400 (step 1206). In particular, registers $R_8$ and $R_9$ can be addressed using the encoded addresses 01000 and 01001 for writing data to registers $R_8$ and $R_9$. Finally, the wr0_data and wr1_data are written into the accessed registers addressable by the encoded addresses 01000 and 01001.

Thus, a register file has been described that can be a memory mapped register file. The register file described herein can be implemented for general computing devices, examples of which include microprocessors, processors, central processing units (CPUs), application specific integrated circuits (ASICs), system on a chips (SOCs), embedded processors or systems, micro-controllers, and other computing devices. Moreover, the register file can be implemented for multi-stage and variable stage pipelining architectures that operate in different processor modes.

Furthermore, in the foregoing specification, the invention has been described with reference to specific exemplary embodiments and implementations thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A register system for a data processing system, the register system comprising:
    an unbanked memory unit having a plurality of memory locations, each memory location being addressable by an encoded address, wherein the encoded address corresponds to one specific register and processor mode;
    input ports to receive inputs for addressing at least one of the memory locations using an encoded address;
    output ports to output data from at least one of the memory locations addressable by an encoded address; and
    a plurality of address encoders, a respective one of the plurality of address encoders for each of the input ports, each of the address encoders to provide an encoded address for accessing one of the memory locations, wherein each of the plurality of address encoders corresponds to only one of the input ports.

2. The register system of claim 1, wherein a plurality of registers correspond to the plurality of memory locations of the unbanked memory unit.

3. The register system of claim 2, wherein each register is addressable by a corresponding encoded address.

4. The register system of claim 3, wherein at least two registers are capable of being accessed in different processor modes using the same encoded address.

5. The register system of claim 2, wherein inputs are received associated with at least one register and processor mode, and wherein at least one of the outputs is data from a register associated with an encoded address obtained from the received inputs.

6. The register system of claim 5, wherein data is outputted from the unbanked memory unit for at least two instructions.

7. The register system of claim 2, wherein inputs are associated with at least one register and processor mode, and wherein one of the inputs is data to be written in a register associated with an encoded address obtained from the received inputs.

8. The register system of claim 7, wherein data for at least two retired instructions is to be written in at least two registers.

9. The register system of claim 1, wherein the plurality of memory locations are discontinuous in the unbanked memory unit.

10. The register system of claim 1, wherein a bit width of the plurality of memory locations is scalable to any arbitrary bit width size.

11. The register system of claim 1, further comprising:
    latches to latch an encoded address from respective ones of the address encoders; and
    selectors coupled to respective ones of the latches and the address encoders, the selectors to select the encoded address from either the latches or the address encoders.

12. The register system of claim 11, wherein the latches store the encoded address as a pipeline storage of the encoded address.

13. A register system for a data processing system, the register system comprising:
    unbanked memory means having a plurality of memory locations, each memory location being addressable by an encoded address, wherein the encoded address corresponds to one specific register means and processor mode;
    a plurality of input means to receive inputs for addressing at least one of the memory locations using an encoded address;
    output means to output data from at least one of the memory locations addressable by an encoded address; and
    a plurality of addressing means, one of the addressing means for each of the input means, each of the addressing means to provide an encoded address for accessing one of the memory locations, wherein each of the plurality of addressing means corresponds to only one of the plurality of input means.

14. The register system of claim 13, wherein a plurality of register means correspond to the plurality of memory locations of the unbanked memory means.

15. The register system of claim 14, wherein each register means is addressable by a corresponding encoded address.

16. The register system of claim 15, wherein at least two register means are capable of being accessed in different processor modes using the same encoded address.

17. The register system of claim 15, wherein inputs are received associated with at least one register means and processor mode, and wherein at least one of the outputs is data from a register means associated with an encoded address obtained from the received inputs.

18. The register system of claim 17, wherein data is outputted from the unbanked memory means for at least two instructions.

19. The register system of claim 14, wherein inputs are associated with at least one register means and processor mode, and wherein one of the inputs is data to be written in a register means associated with an encoded address obtained from the received inputs.

20. The register system of claim 19, wherein data for at least two retired instructions is to be written in at least two register means.

21. The register system of claim 13, wherein the plurality of memory locations are discontinuous in the unbanked memory means.

22. The register system of claim 13, wherein a bit width of the plurality of memory locations is scalable to any arbitrary bit width size.

23. The register system of claim 13, further comprising:
a plurality of latching means to latch an encoded address from respective ones of the addressing means; and
a plurality of selecting means coupled to respective ones of the latching means and the addressing means, the selecting means to select the encoded address from either the latching means or the addressing means.

24. The register system of claim 23, wherein the latching means stores the encoded address as a pipeline storage of the encoded address.

25. A processor comprising:
an integrated circuit including:
an unbanked memory unit having input ports for addressing a plurality of memory locations, each memory location being addressable by an encoded address, wherein the encoded address corresponds to one specific register and processor mode; and
a plurality of address encoders to provide at least one encoded address for addressing at least one of the memory locations, wherein each of the plurality of address encoders corresponds to only one of the input ports.

26. The processor of claim 25, wherein a plurality of registers correspond to the plurality of memory locations in the unbanked memory unit.

27. The processor of claim 26, wherein each register is addressable by a corresponding encoded address.

28. The processor of claim 27, wherein at least two registers are capable of being accessed in different processor modes using the same encoded address.

29. The processor of claim 25, wherein the plurality of memory locations are discontinuous in the unbanked memory unit.

30. The processor of claim 25, wherein a bit width of the plurality of memory locations is scalable to any arbitrary bit width size.

31. The processor of claim 25, wherein each address encoder includes input ports to receive inputs associated with at least one register and processor mode in providing a corresponding encoded address.

32. The processor of claim 31, wherein each address encoder includes logic circuitry to obtain the corresponding encoded address based on the received inputs.

33. The processor of claim 32, wherein the logic circuitry includes at least one of a programmable gate array (PGA) or a field programmable gate array (FPGA).

34. The processor of claim 25, wherein the processor is at least one of an embedded processor and a microprocessor.

35. A data processing system comprising:
a memory mapped register system for accessing a plurality of memory locations via input ports, each memory location being addressable by an encoded address, wherein the encoded address corresponds to one specific register and processor mode; and
a plurality of address encoders, a respective one of the plurality of address encoders for each of a plurality of input ports of the register system, each of the address encoders to provide an encoded address for accessing one of the memory locations, wherein each of the plurality of address encoders corresponds to only one of the input ports.

36. The data processing system of claim 35, wherein a plurality of registers correspond to the plurality of memory locations.

37. The data processing system of claim 36, wherein each register is addressable by a corresponding encoded address.

38. A processor comprising:
circuit means including:
unbanked memory means having input means for addressing a plurality of memory locations, each memory location being addressable by an encoded address, wherein the encoded address corresponds to one specific register means and processor mode; and
a plurality of addressing means to provide at least one encoded address for addressing at least one of the memory locations, wherein each of the plurality of addressing means corresponds to only one of the input means.

39. The processor of claim 38, wherein a plurality of register means correspond to the plurality of memory locations of the unbanked memory means.

40. The processor of claim 39, wherein each register means is addressable by a corresponding encoded address.

41. The processor of claim 40, wherein at least two register means are capable of being accessed in different processor modes using the same encoded address.

42. The processor of claim 38, wherein the plurality of memory locations are discontinuous in the unbanked memory means.

43. The processor of claim 38, wherein a bit width of the plurality of memory locations is scalable to any arbitrary bit width size.

44. The processor of claim 38, wherein each addressing means includes input means to receive inputs associated with at least one register means and processor mode in providing a corresponding encoded address.

45. The processor of claim 44, wherein each addressing means includes logic means to obtain the corresponding encoded address based on the received inputs.

46. The processor of claim 45, wherein the logic means includes at least one of a programmable gate array (PGA) or a field programmable gate array (FPGA).

47. The processor of claim 38, wherein the processor is at least one of an embedded processor and a microprocessor.

48. An integrated circuit method comprising:

configuring an integrated circuit to receive a plurality of inputs;

configuring the integrated circuit to determine an unbanked encoded address based on the received inputs, wherein the unbanked encoded address corresponds to one specific register and processor mode;

receiving the plurality of inputs from a plurality of address encoders;

configuring the integrated circuit to access a register via a corresponding one of a plurality of input ports using an unbanked encoded address; and configuring the integrated circuit to output data from the accessed register, wherein each of the plurality of address encoders corresponds to only one of the plurality of input ports.

49. The method of claim 48, further comprising:

configuring the integrated circuit to output data for multiple instructions.

50. The method of claim 48, further comprising:

configuring the integrated circuit to write data to the accessed register.

51. The method of claim 50, further comprising:

configuring the integrated circuit to write data to one or more accessed registers for multiple executed instructions.

52. A method for accessing an unbanked memory unit having a plurality of memory locations comprising:

receiving a memory request for accessing the unbanked memory unit at one of a plurality of address encoders, the memory request including a register index input and a processor mode input;

encoding the register index input and processor mode input at the one of the plurality of address encoders to obtain an encoded address;

accessing at least one of the memory locations of the unbanked memory unit via input ports in accordance with the encoded address, wherein the encoded address corresponds to at least one register and processor mode; and writing data into or reading data from the accessed memory location, wherein each of the plurality of address encoders corresponds to only one of the input ports.

53. The method of claim 52, wherein writing data into or reading data from the accessed memory location includes writing data into or reading data from the accessed memory location for multiple instructions.

\* \* \* \* \*

UNITED STATES PATENT AND TRADEMARK OFFICE
CERTIFICATE OF CORRECTION

PATENT NO. : 7,568,083 B1
APPLICATION NO. : 10/666892
DATED : July 28, 2009
INVENTOR(S) : Hong-Yi Chen et al.

It is certified that error appears in the above-identified patent and that said Letters Patent is hereby corrected as shown below:

Column 2, Line 43   Delete "FINNEGAN" after "file"
Column 3, Line 8    Delete "FINNEGAN" after "method"
Column 3, Line 66   Delete "FINNEGAN" before "registers"
Column 8, Line 3    Delete "FINNEGAN" before "write"
Column 9, Line 35-36   Delete "FINNEGAN" before "unit"

Signed and Sealed this

Sixth Day of October, 2009

David J. Kappos
*Director of the United States Patent and Trademark Office*